(12) United States Patent
Cheng et al.

(10) Patent No.: US 8,458,492 B2
(45) Date of Patent: Jun. 4, 2013

(54) CRYPTO-ENGINE FOR CRYPTOGRAPHIC PROCESSING OF DATA

(75) Inventors: Lee Ming Cheng, Hong Kong (HK); Ting On Ngan, Hong Kong (HK); Ka Wai Hau, Hong Kong (HK)

(73) Assignee: Intellectual Ventures Holding 57 LLC, Las Vegas, NV (US)

( * ) Notice: Subject to any disclaimer, the term of this patent is extended or adjusted under 35 U.S.C. 154(b) by 810 days.

(21) Appl. No.: 12/589,605

(22) Filed: Oct. 26, 2009

(65) Prior Publication Data
US 2010/0049945 A1 Feb. 25, 2010

Related U.S. Application Data

(63) Continuation of application No. 10/641,869, filed on Aug. 15, 2003, now Pat. No. 7,634,666.

(51) Int. Cl.
*H04L 29/06* (2006.01)
*G06F 17/10* (2006.01)

(52) U.S. Cl.
USPC .............. 713/191; 713/189; 713/192; 380/30

(58) Field of Classification Search
None
See application file for complete search history.

(56) References Cited

U.S. PATENT DOCUMENTS

| 4,316,055 | A |  | 2/1982 | Feistel |
|---|---|---|---|---|
| 4,484,301 | A |  | 11/1984 | Borgerding et al. |
| 4,891,781 | A |  | 1/1990 | Omura |
| 6,230,179 | B1 |  | 5/2001 | Dworkin et al. |
| 6,397,241 | B1 | * | 5/2002 | Glaser et al. ................. 708/625 |
| 6,671,709 | B2 |  | 12/2003 | Glaser et al. |
| 7,027,597 | B1 |  | 4/2006 | Stojancic et al. |
| 7,277,540 | B1 |  | 10/2007 | Shiba et al. |
| 2002/0191791 | A1 | * | 12/2002 | Anand ......................... 380/255 |

FOREIGN PATENT DOCUMENTS

WO  0046954  8/2000

OTHER PUBLICATIONS

Office Action, mailed Feb. 13, 2007 for U.S. Appl. No. 10/641,869.
Office Action, mailed Oct. 17, 2007 for U.S. Appl. No. 10/641,869.
Office Action, mailed Aug. 21, 2008 for U.S. Appl. No. 10/641,869.
Notice of Allowability, mailed Jul. 24, 2009 for U.S. Appl. No. 10/641,869.

* cited by examiner

*Primary Examiner* — Shin-Hon Chen
(74) *Attorney, Agent, or Firm* — Schwabe, Williamson & Wyatt, P.C.

(57) ABSTRACT

A crypto-engine for cryptographic processing has an arithmetic unit and an interface controller for managing communications between the arithmetic unit and a host processor. The arithmetic unit has a memory unit for storing and loading data and arithmetic units for performing arithmetic operations on the data. The memory and arithmetic units are controlled by an arithmetic controller.

18 Claims, 8 Drawing Sheets

CRYPTO-ENGINE FOR CRYPTOGRAPHIC PROCESSING OF DATA

CROSS-REFERENCE TO RELATED APPLICATIONS

This application is a continuation of U.S. patent application Ser. No. 10/641,869, filed on Aug. 15, 2003, and claims priority to the Ser. No. 10/641,869 application, which is now U.S. Pat. No. 7,634,666.

BACKGROUND OF THE INVENTION

1. Field of the Invention

The invention relates to crypto-engines for cryptographic processing of data. More particularly, the invention relates to a crypto-engine capable of executing either Rivest-Shamir-Adleman (RSA) or Elliptic Curve Cryptography (ECC) public key encryption protocols.

2. Description of Prior Art

The RSA public-key cryptosystem devised by Rivest, Shamir and Adleman and the EEC cryptosystem devised by Koblitz and Miller are two common algorithms adopted by public key infrastructures.

RSA involves a computation of the exponentiation and modulo of product of two large prime numbers whereas ECC is based on computations with points on an elliptic curve. To achieve faster speed, hardware architectures are normally used to implement these algorithms.

In RSA, the main basic operation is the modular multiplication. When the ECC is implemented over the field GF(p), where p is a large prime number, the main basic operations are also modular multiplication. Thus the two algorithms share a common operation. However, in known hardware architectures resources cannot be shared by the algorithms and reused.

SUMMARY OF THE INVENTION

It is an object of the present invention to provide a hardware based crypto-engine for asymmetric cryptograhic processing using RCA or ECC algorithms. It is a further object of the invention to provide a crypto-engine that operates as a coprocessor to a host processor.

According to the invention there is provided a crypto-engine for cryptographic processing of data comprising an arithmetic unit operable as a co-processor for a host processor and an interface controller for managing communications between the arithmetic unit and host processor, the arithmetic unit including:

a memory unit for storing and loading data, a multiplication unit, an addition unit and a sign inversion unit for performing arithmetic operations on said data, and an arithmetic controller for controlling the storing and loading of data by the memory unit and for enabling the multiplication, addition and sign inversion units.

Preferably, the memory unit comprises:

an input switch for selecting input/interim data, a plurality of Static Random Access Memory elements for receiving and storing the input/interim data from the input switch, a plurality of output switches connected to the memory elements, and an address controller for controlling flow of the data through the switches and memory elements.

Preferably, the multiplication unit comprises:

a register to pre-store the multiplier data, a pair of multiplication elements for performing multiplication, a shift register to load the multiplier data bitwise into the multiplication elements, and a first-in-first-out register for synchronizing data is movement between the multiplication elements.

Preferably, the multiplication elements comprise a bitwise segmented multiplier, a bitwise segmented multiplicand, and a modulo for performing modular multiplication of the multiplier and multiplicand according to the modulo value.

Preferably, the interface controller comprises a bus interface for connecting high frequency manipulated data inside the arithmetic unit with the lower frequency manipulated data in the host processor, a concatenater/splitter for merging or splitting data width, and a cryptographic controller for generating status and interrupt signals for the host processor and having a op-code generator for generating the op-code signals for the arithmetic unit to select RSA or ECC operations and to synchronize the timing discrepancy of heterogeneous processing.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

In the invention a common architecture platform for the two algorithms, RSA and ECC, whose inputs are taken in two different forms, is used to manipulate the two asymmetric encryption algorithms. In the preferred embodiment the combining function is restricted to the computational engine, i.e. modular manipulation. This relies heavily on the low-bit, say 8 bit, processor software to complete the design. Thus, three design considerations must are taken into account. These considerations are:

1) hardware optimization for both RSA and ECC implementation with the best speed/resource trade off, 2) the amount of design/module reuse and hardware sharing of the two protocols, and 3) the asynchronous executing of the hardware modules in much higher speed than the processor communicating with it, i.e. heterogeneous processing.

The preferred embodiment of the present invention provides a compact crypto-engine capable of executing asymmetric cryptographic algorithms including both RSA and ECC protocols and has heterogeneous computation ability running at a higher internal clock speed.

Figure 1:
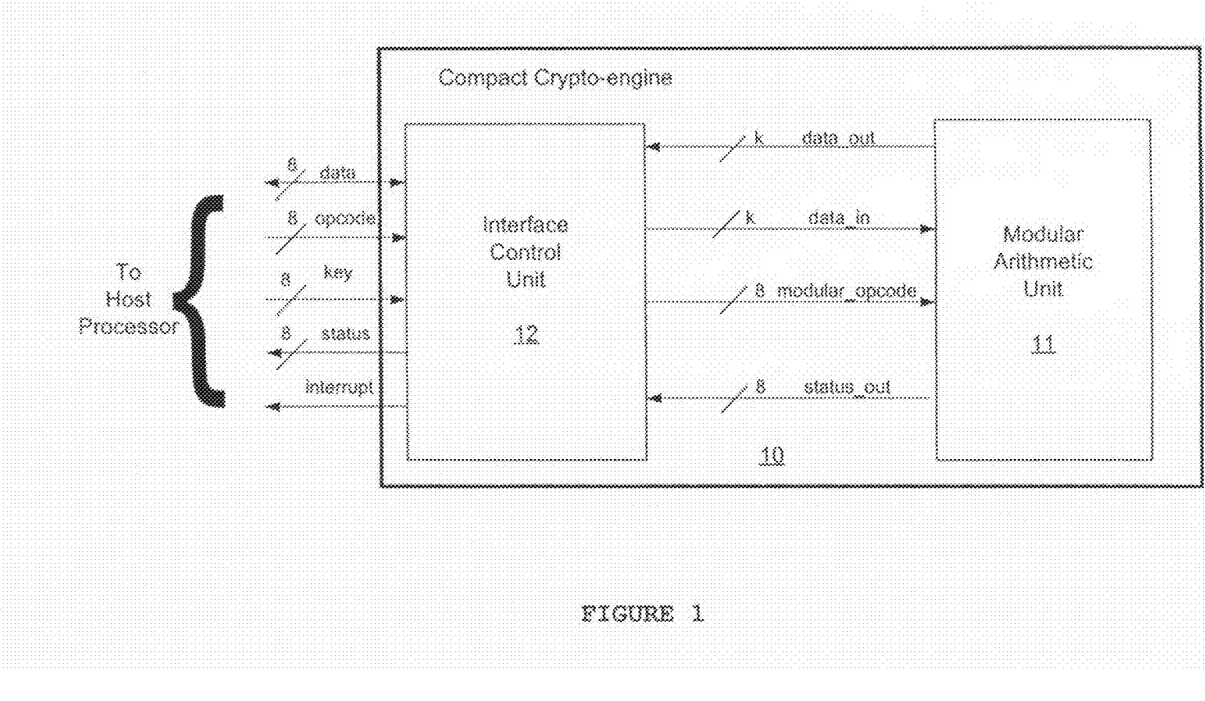
FIG. 1 is a block diagram of a compact crypto-engine for asymmetric cryptographic processing according to the invention.

Referring to FIG. 1, the preferred embodiment of a compact crypto-engine 10 comprises a Modular Arithmetic Unit (MAU) 11 and an Interface Control Unit (ICU) 12. The inputs and outputs of the ICU are provided from/to a host processor (not shown) such as a personal, network computer or Digital Signal Processor. The host processor provides an 8-bit 'data' transput (input and output) to and from ICU 12, and 8-bit 'key' and operation code ('opcode') inputs to ICU 12. The ICU 12 has an 8-bit 'status' and a 1-bit 'interrupt' output to signal the host processor. Communication between the ICU 12 and MAU 11 comprises a k-bit 'data_in' and a 8-bit 'modular_opcode' signals from the ICU 12 to the MAU 11, and a k-bit 'data_out' and a 8-bit 'status_out' signals from the MAU 11 to the ICU 12.

Figure 2:
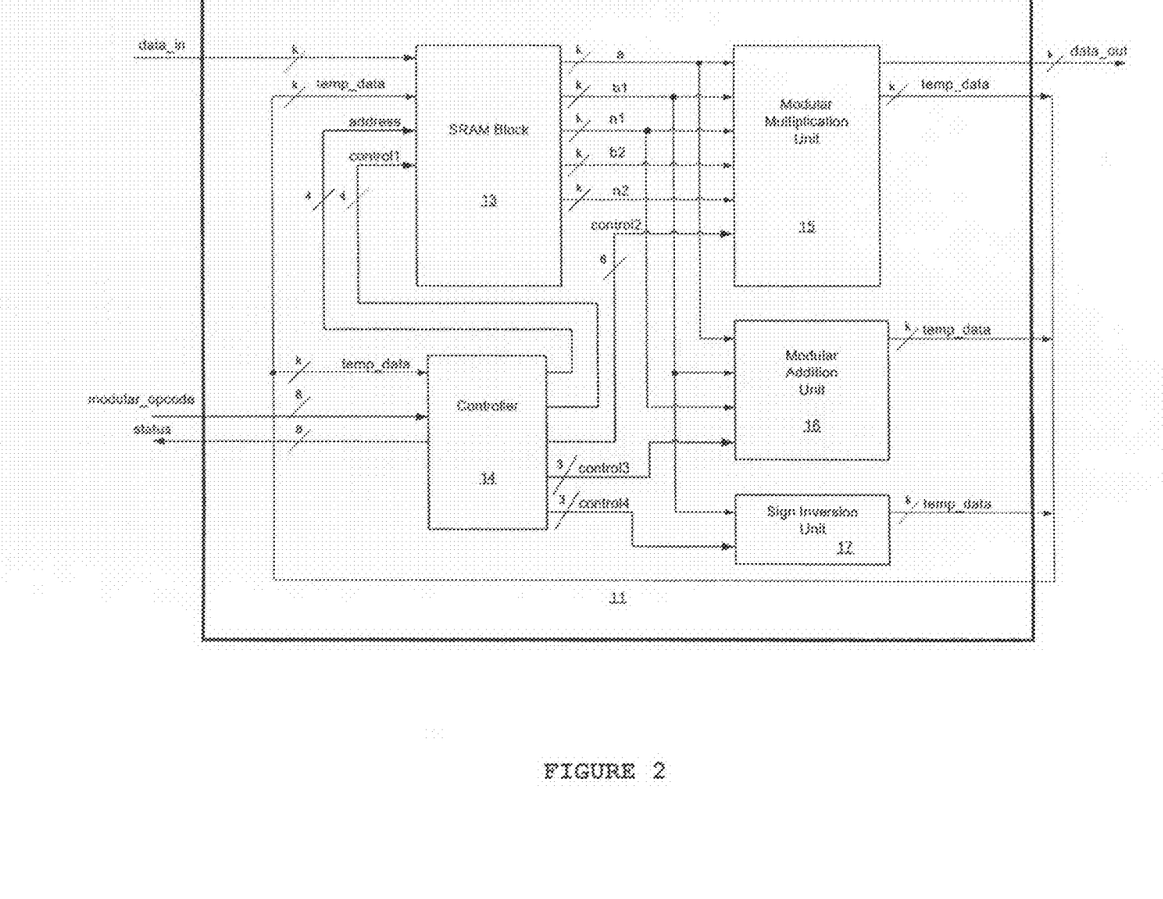
FIG. 2 is a block diagram of a modular arithmetic unit.

Referring to FIG. 2, the MAU 11 comprises an SRAM Block 13, a Controller 14, a Modular Multiplication Unit (MMU) 15, a Modular Addition Unit (MADU) 16 and a Sign Inversion Unit (SIU) 17. The outputs k-bit 'data_in' of ICU 12, k-bit 'temp_data' of MMU 15/MADU 16/SIU 17, 4-bit 'address' and 4-bit 'control1' of Controller 14 go into SRAM Block 13. The output k-bit 'a/b1/b2/n1/n2' of SRAM Block 13 goes to MMU 15. The output k-bit 'a/b1/n1' of SRAM Block 13 goes to MADU 16. The output k-bit 'b1' of SRAM Block 13 goes to SIU 17.

The outputs 8-bit 'modular_opcode' of ICU 12 and k-bit 'temp_data' of MMU 15/MADU 16/SIU 17 go to Controller 14. The outputs 4-bit 'address/control1' of Controller 14 goes to SRAM Block 13. The output 6-bit 'control2' goes to MMU 15. The output 3-bit 'control3' of Controller 14 goes to MADU 16. The output 3-bit 'control4' of Controller 14 goes to SIU 17. The 8-bit 'status_out' of Controller 14 goes to ICU 12. The outputs k-bit 'a/b1/b2/n1/n2' of SRAM Block 13 and 6-bit 'control2' of Controller 14 go to MMU 15. The output k-bit 'data_out' of MMU 15 goes to ICU 12 and the output k-bit 'temp_data' of MMU 15 goes to SRAM Block 13 and Controller 14.

The outputs k-bit 'a/b1/n1' of SRAM Block 13 and 3-bit 'control3' of Controller 14 go to MADU 16. The output k-bit 'temp_data' of MADU 16 go to SRAM Block 13 and Controller 14. The outputs k-bit 'b1' of SRAM Block 13 and 3-bit 'control4' of Controller 14 go to SIU 17. The output k-bit 'temp_data' of SIU 17 goes to SRAM Block 13 and Controller 14.

Figure 3:
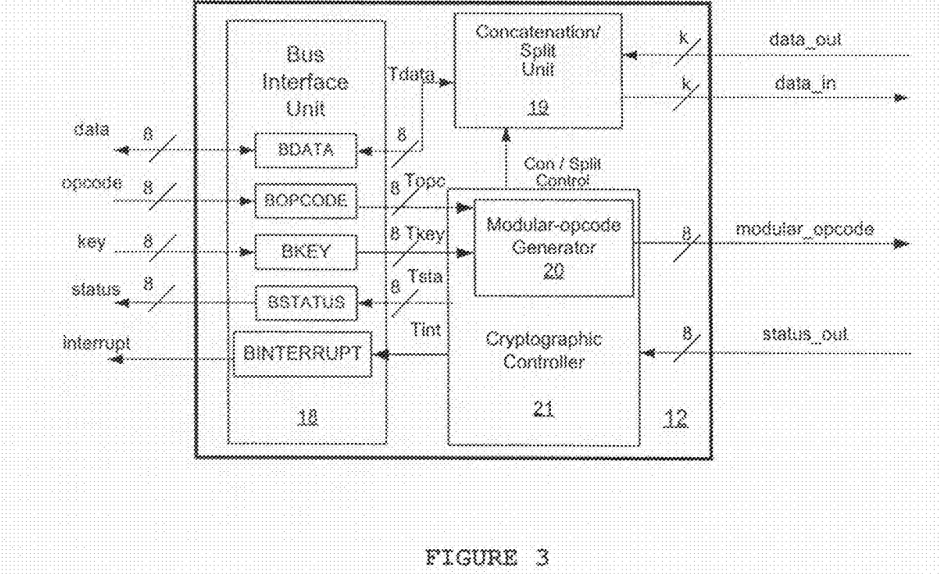
FIG. 3 is a block diagram of an interface control unit.

Referring to FIG. 3, the Interface Control Unit 11 comprises a Bus Interface Unit (BIU) 18, a Concatenation/Split Unit (CSU) 19 and a Modular-opcode Generator (MOG) 20 embedded into a Cryptographic Controller (CrC) 21. The 8-bit transput (input and output) 'data' of buffer BDATA in BIU 18 is provided to the host processor. The 8-bit outputs 'opcode' and 'key' from the host processor are provided to the buffer BOPCODE and BKEY respectively in the BIU 18. The 8-bit output 'status' and 1-bit output 'interrupt' of BSTATUS and BINTERRUPT in BIU 18 respectively are provided to the host processor. In the preferred embodiment, the ICU provides buffers to handle heterogeneous operation and the 'interrupt' signal to synchronize the data exchange. This allows the crypto-engine 10 to operate at a different clock speed to the host processor.

The 8-bit transput 'Tdata' of Buffer BDATA in BIU 18 is provided to the Concatenation/Split Unit 19. The 8-bit outputs 'Topc' and 'Tkey' of buffer BOPCODE and BKEY respectively in the BIU 18 are provided to the Modular-opcode Generator (MOG) 20 inside Cryptographic Controller (CrC) 21. The outputs 8-bit 'Tsta' and 1-bit 'Tint' generated from the 'status_out' signal in the CrC 21 are provided to the BIU 18. The k-bit output 'data_in' of Concatenation/Split Unit (CSU) 19, generated by cascading a sequence of 8-bit 'Tdata', is provided to MAU 11. The k-bit output 'data_out' of MAU 11, converted to a sequence of 8-bit 'Tdata', is provided to Concatenation/Split Unit (CSU) 19. The 8-bit output 'module_opcode' of MOG 20, generated from signals 'Topc' and 'Tkey', is provided to MAU 11. The 8-bit output 'status_out' of MAU 11 is provided to CrC 21 to generate the 8-bit 'Tsta' and 1-bit 'Tint' signals.

Figure 4:
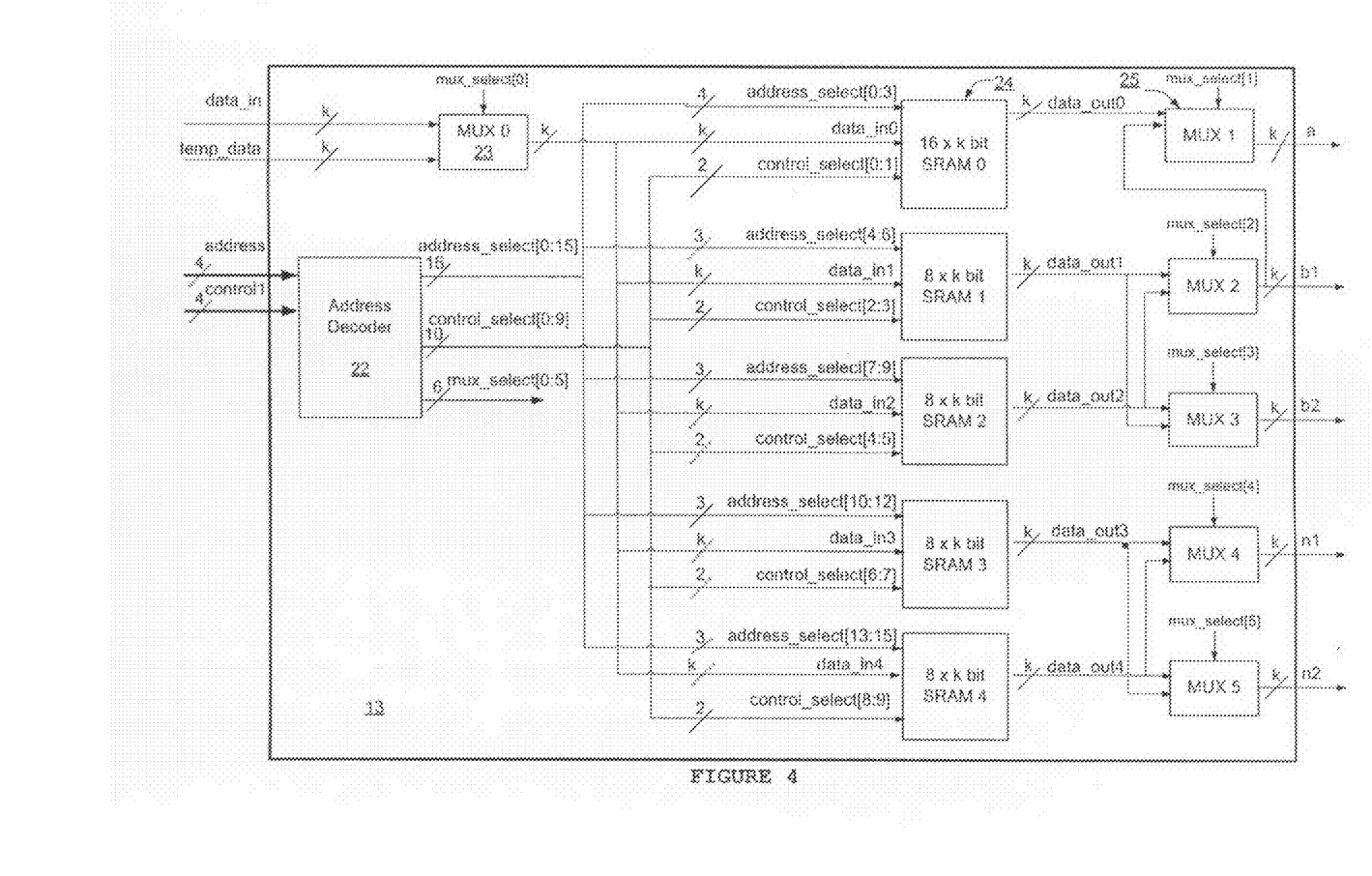
FIG. 4 is a block diagram of Static Random Access Memory (SRAM) Block.

Referring to FIG. 4, the Static Random Access Memory (SRAM) block 13 comprises an Address Decoder 22, a plurality of switches MUX0 23 and MUX1/MUX2/MUX3/MUX4/MUX5 25, a plurality of memory blocks 24 comprising one 16×k-bit SRAM0 and four 8×k-bit SRAM1/SRAM2/SRAM3/SRAM4/SRAM5. In the preferred embodiment there are a total of 3×1024-bit SRAM blocks to store the 5 parameters 'a/b1/n1/b2/n2' for 1024-bit RSA modular multiplication in various stages or to store 192-bit ECC temporary data. The gate counts required for storing of interim manipulation results are substantially reduced.

To ameliorate the overflow problems that may be encountered during the modular multiplication calculation in MMU 15, a memory-size-expansion approach is adopted with according to the memory block size provided by Integrated Circuit fabrication supplier, say a 1152-bit memory for a 1024-bit manipulation.

Another preferred approach to overcome the overflow problem is to provide an "overflow control unit" with additional one bit for checking, say 1025-bit memory for 1024-bit manipulation.

Still referring to FIG. 4, the 4-bit outputs 'address' and 'control1' of Controller 14 are provided to Address Decoder 22 to generate one 16-bit 'address_select[0:15]' output, one 10-bit 'control_select[0:9]' output and one 6-bit 'mux_select[0:5]' output. The output first bit 'mux_select[0]' of Address Decoder 22 is provided to switch MUX0 23 to select either k-bit 'data_in' outputted by ICU 12 or k-bit 'temp_data' outputted by MMU 15/MAU 16/SIU 17. The outputs k-bit 'data_in0', 'data_in1', 'data_in2', 'data_in3', and 'data_in4' of MUX0 23 are provided to SRAM0, SRAM1, SRAM2, SRAM3 and SRAM4 24 respectively.

The output 3-bit address_select[0:3], address_select[4:6], address_select [7:9], address_select [10:12] and address_select[13:15] of Address Decoder 22 is provided to SRAM0, SRAM1, SRAM2, SRAM3 and SRAM4 24 respectively. The output 2-bit control_select[0:1], control_select[2:3], control_select [4:5], control_select [6:7] and control_select[8:9] of Address Decoder 22 are provided to SRAM0, SRAM1, SRAM2, SRAM3 and SRAM4 24 respectively.

SRAM0, SRAM1, SRAM2, SRAM3 and SRAM4 receive respective signals 'address_select[0:15]', 'data$_{13}$ in0'/'data$_{13}$ in1'/'data_in2'/'data_in3'/'data_in4 and 'control_select[0:9]' to generate respective k-bit outputs 'data_out0', 'data_out1', 'data_out2', 'data_out3' and 'data_out4'.

The 1-bit outputs 'mux_select[1]', 'mux_select[2]', 'mux_ select[3]', 'mux_select[4]' and 'mux_select[5]' of Address Decoder 22 control switches 25 to select between MUX1 inputs 'data_out0' or 'b1', MUX2 and MUX3 inputs 'data_out1' or 'data_out2' and MUX4 and MUX5 inputs 'data_out3' or 'data_out4'.

Referring to FIG. 2, the k-bit outputs 'a', 'b1', 'b2', 'n1' and 'n2' of switches 25 are provided to MMU 15; outputs 'a', 'b1' and 'n1' are provided to MAU 16; and output 'b1' is provided to SIU 17.

Figure 5:
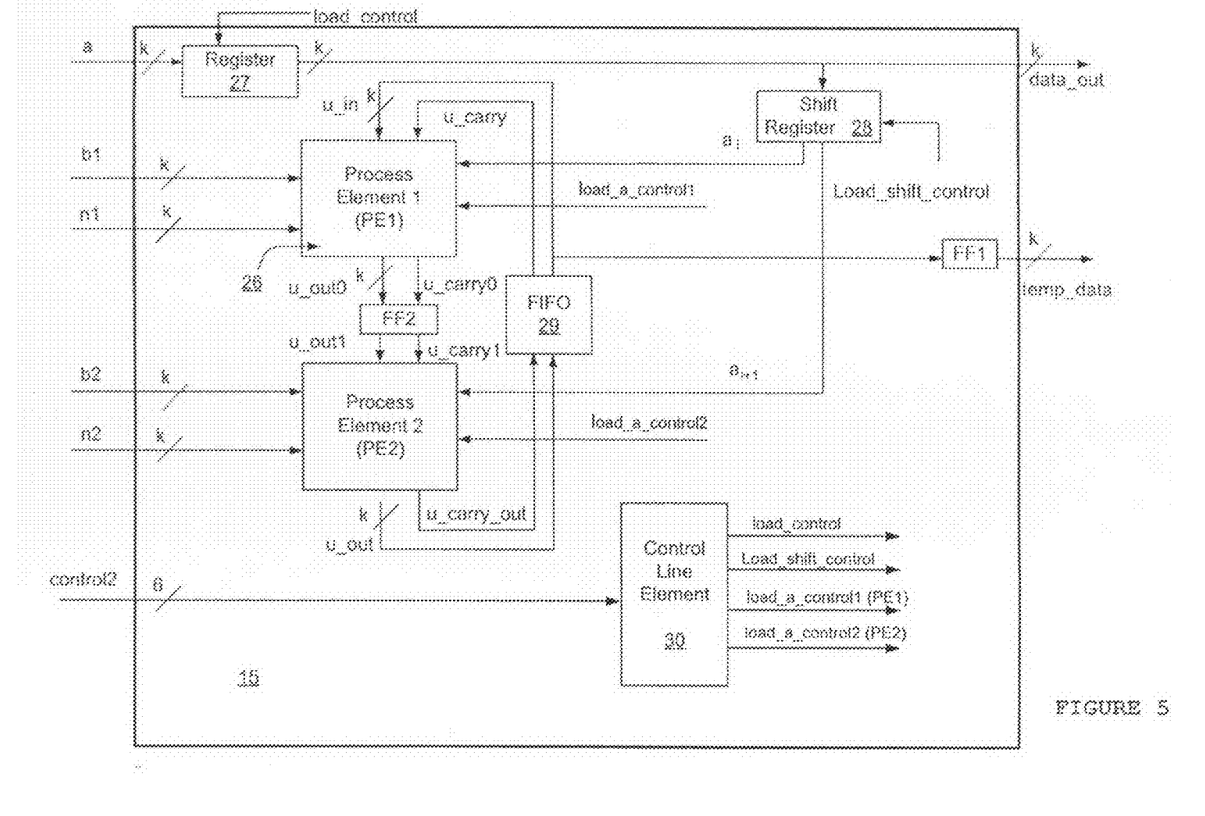
FIG. 5 is a block diagram of a modular multiplication unit.

Referring to FIG. 5, the Modular Multiplication Unit MMU 15 comprises a pair of Process Elements PE1 26 and PE2 link up with a Flop-flip (FF), a Register 27, a Shift Register 28, a First in First Out Flip-flop (FIFO) 29 and a Control Line Element (CLE) 30. The 6-bit output 'control2' of Controller 14 is provided to Control Line Element 30 and is decoded into a plurality of outputs 'load_control', 'load_shift_control', 'load_a_control1' (PE1) and 'load_a_control2' (PE2).

The k-bit output 'a' of SRAM Block 13 is provided to Register 27. The k-bit output 'data_out' of Register 27 is provided to Shift Register 28 and to ICU 12 when the output 'load_control' of CLE 30 is set.

The 1-bit outputs '$a_i$' and '$a_{i+1}$' of Shift Register 28 are provided to Process Element 1 (PE1) 26 and Process Element 2 (PE2) respectively when the output 'load_shift_control' of CLE 30 is set.

In the preferred embodiment the interim data 'u_out' and 'u_carry_out' are included with (k+1)-bit instead of normal (2+k)-bit for logic gate size (physical hardware size) reduction and the FIFO 29 is used as a delay line for the inputs k-bit 'u_out' and 1-bit 'u_carry_out' of PE2 to provide the inputs k-bit 'u_in' and 1-bit 'u_carry' of PE1. The k-bit output 'u_in' of FIFO 29 is provided to a Flip-flop (FF1) and the k-bit output 'temp_data' of FF1 is provided to SRAM Block 13.

The k-bit outputs 'b1' and 'n1' of SRAM Block 13, the outputs k-bit 'u_in' and 1-bit 'u_carry' of FIFO 29, the output '$a_i$' of Shift Register 28 and the outputs 1-bit 'load_a_control1' (PE1) of CLE 30 are provided to Process Element 1 (PE1) to generate the outputs k-bit 'u_out0' and 1-bit 'u_carry0'. The outputs k-bit 'u_out0' and 1-bit 'u_carry0' are provided to Flip-flop (FF2) to generate the outputs k-bit 'u_out1' and 1-bit 'u_carry1'.

The k-bit outputs 'b2' and 'n2' of SRAM Block 13, the outputs k-bit 'u_out1' and 1-bit 'u_carry1' of Flip-flop (FF2), the output '$a_{i+1}$' of Shift Register 28 and the outputs 1-bit 'load_a_control2' of CLE 30 are provided to Process Element 2 (PE2) to generate the outputs k-bit 'u_out' and 1-bit 'u_carry_out'. The outputs k-bit 'u_out' and 1-bit 'u_carry_out' are provided to FIFO 29 to generate the outputs k-bit 'u_in' and 1-bit 'u_carry'.

Figure 6:
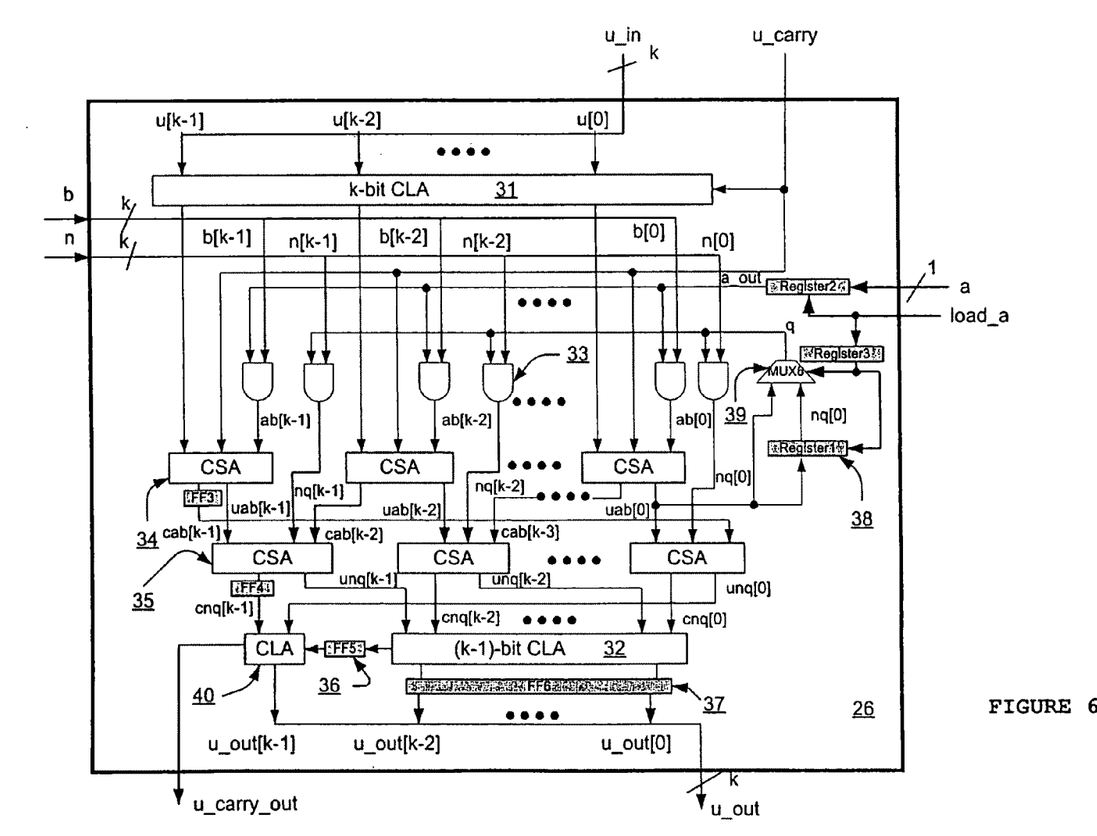
FIG. 6 is a block diagram of a processor element.

Referring to FIG. 6, the processor elements (PEs) implement Montgomery's multiplication to generate the modular multiplication. By defining $$A = \sum_{i=0}^{m-1} a_i 2^i, \quad B = \sum_{i=0}^{m-1} b_i 2^i; \quad N = \sum_{i=0}^{m-1} n_i 2^i \text{ and } U = \sum_{i=0}^{m-1} u_i 2^i$$

as the multiplier, multiplicand, modulo and modular product (result) respectively, for m bit integers where $\{a_i,b_i,n_i,u_i\} \in \{0, 1\}$, the basic algorithm for Montgomery's multiplication is given as follows:

```
Module PE(A,B,U,N,m)
{U_{-1} := 0;
 for i = 0 to m do
   q_i := (U_{i-1} + a_i B) mod 2; //LSB of U_{i-1} = u_{0,i-1}
   U_i := (U_{i-1} + q_i N + a_i B) div 2
 endfor
 return U_m
}
```

In order to optimize the Process Element (PE) sizes for a compact hardware implementation, instead of full m-size PE elements, k-size (where m=e×k) PE pairs are included and parameters $A^j$, $B^j$, $N^j$ and $U^j$ are included where $$A = \sum_{j=0}^{e-1} A^j, \quad B = \sum_{j=0}^{e-1} B^j, \quad N = \sum_{j=0}^{e-1} N^j \text{ and } U = \sum_{j=0}^{e-1} U^j.$$

The algorithm is modified into:

```
//where superscripts = blocks, subscripts = bits and for
U_{i-1} = u_{0,i-1}, 0 is the first outer-loop.
    Module PE(A,B,U, N, m)
    {U_{-1} := 0;
     for i = 0 to m do
     // q_i is implemented using MUX6 39 and CSA 34
        q_i := u_{0,i-1} + a_i b_0;
        (u_carry,U_i^0) = a_i B^0 + U_{i-1}^0; //implemented using CSA 34
        (u_carry,U_i^0) = U_i^0 + q_i N^0 + u_carry;
        for j = 1 to e-1 do
     // perform (u_carry,U_i^j) = a_i B^j + U_{i-1}^j + q_i N^j + u_carry;
     //implement using CSA 34, i.e. U_i^j = (a_i & B^j) ⊕ U_{i-1}^j ⊕ u_carry
     // u_carry = (a_i & B^j & u_carry)|(U_{i-1}^j & u_carry)|(a_i & B^j & U_{i-1}^j)
     // results store as (cab's, uab's)
            (u_carry,U_i^j) = a_i B^j + U_{i-1}^j + u_carry;
     //implement using CSA 35, i.e. U_i^j = (q_i & N^j) ⊕ U_i^j ⊕ u_carry
     // u_carry = (q_i & N^j & u_carry)|(U_i^j & u_carry)|(q_i & N^j & U_i^j)
     // results store as (cnq's, unq's)
            (u_carry,U_i^j) = U_i^j + q_i N^j + u_carry;
     // concatenate the LSB of U_j to MSB of U_{j-1} as carry &
     // U_i^{j-1} := U_i^{j-1} div2, implement using CLAs 32 and 40
     // results store as (u_carry_out, u_out)
            U_i^{j-1} := (u_{0,i}^j, U_{k-1...1}^{j-1});
        endfor
        U_i^{(e-1)} := (u_carry,U_{k-1∧1}^{(e-1)})
     endfor
     Return U_m
    }
```

In the preferred embodiment the Process Element 26 and the modified algorithm include a k-bit Carry Look-ahead Adder (CLA) 31, a (k−1)-bit CLA 32, a plurality of AND gates 33, a plurality of Carry Save Adders (CSA) level 1 34 and level 2 35, a plurality of Flip-flops 36, a (k−1)-bit Flip-flop 37, registers 38, a Multiplexer MUX6 39 and a single CLA 40.

The outputs k-bit 'u_in' and 1-bit 'u_carry' of FIFO 29 are provided to a k-bit CLA 31 of Process Element 1 (PE1) 26. For Process Element 2 (PE2), the outputs k-bit 'u_out1' and 1-bit 'u_carry1' are provided to a k-bit CLA 31. The outputs k-bit 'b' (b1 or b2) of SRAM Block 13 and k-bit 'a_out' of Register1 are provided bitwise to a plurality of two-input AND gates 33. The outputs k-bit 'u[0:k−1]' of k-bit CLA 31, 1-bit 'u_carry' of FIFO 29 and 'ab[0:k−1]' of AND gates 33 are provided to level 1 CSA 34 to generate a plurality of add results 'uab(0:k−1)' and carry 'cab[0:k−1]'.

The outputs 1-bit 'q' of MUX6 and k-bit 'n' (n1 or n2) of SRAM Block 13 are provided to a plurality of AND gates to generate a k-bit output 'nq[0:k−1]'. The outputs k-bit 'nq[0:k−1]' of a plurality of AND gates 33, k-bit 'uab[0:k−1]' and k-bit 'cab[0:k−1]' are provided to level 2 CSA 35 bitwise to generate a plurality of add results 'unq[0:k−1]' and carry 'cnq[0:k−1]'. Preferably, the output 'cab[k−1]' goes through a Flip-flop (FF3) to bit-0 (of level 2) CSA 35.

The outputs k-bit 'unq[0:k−1]' and 'cnq[0:k−1]' of a plurality of CSAs 35 are provided to a (k−1)-bit CLA 32 and 1-bit CLA 40 to generate the outputs k-bit 'u_out' and 1-bit 'u_carry_out'. Preferably, the output 'cnq(k−1)' of CSA goes through a Flip-flop (FF4) to CLA 40 and the output is carry of (k−1)-bit CLA 32 goes through a Flip-flop (FF5) 36 to CLA 40. Preferably, the outputs of (k−1)-bit CLA 32 go through a plurality of Flip-flops (FF6) 37 to generate the outputs 'u_out[0:k−2]' of 'u_out'.

The outputs 'uab[0]' of bit-0 CSA 34 and 1-bit delayed 'uab[0]' of Register1 38 are provided to MUX6 39 to give output 'q' according to condition of an output 'load_a' of CLE 30. The output 'q' of Register1 38 is generated according to the outputs 'uab[0]' of bit-0 CSA 34 and delayed 'load_a' from Register3 of CLE 30.

The outputs 1-bit 'load_a' of CLE 30 and 1-bit 'a' of Shift Register 28 are provided to Register2 to generate an output of 1-bit 'a_out'.

Embodiments of the invention have been implemented using 0.35 μm semiconductor technology. A total gate count of 15K for RSA and 20K for both RSA and ECC was utilized for k=64. The benchmark testing for a 1024 (1024-bit) RSA is summarized in Table 1 as follows with an internal clock of 22 MHz.

TABLE 1

Performance of various RSA operations

| Exponent | No. of '1's | No. of '0's | Modulus | Computation time |
|---|---|---|---|---|
| 17 bit[1] | 2 | 15 | 1024 bit | 7 ms |
| 1024 bit[2] | 512 | 512 | 1024 bit | 607 ms |

[1]The public key $e = 2^{16} + 1 = 65537$ is used.
[2]Average case, 1024-bit exponent, 50% '1', 50% '0' in binary representation.

The benchmark device is capable of running at 100 MHz where the computational time can be reduced to 0.18 seconds for the worst case scenario.

With the heterogeneous computation ability, the process can be executed in a much higher clock rate using phase lock clock multiplier to allow faster computational and thus transaction time.

A implementation example of an RSA coprocessor is based on four special function registers (SFRs) RSAD, RSAO, RSAS and RSAK in a host processor for controlling and monitoring the RSA coprocessor. A brief description of the SFRs now follows:

RSA DATA (RSAD)

| Bit: | 7 | 6 | 5 | 4 | 3 | 2 | 1 | 0 |
|---|---|---|---|---|---|---|---|---|
| | RSAD.7 | RSAD.6 | RSAD.5 | RSAD.4 | RSAD.3 | RSAD.2 | RSAD.1 | RSAD.0 |

The bi-directional SFR is accessed via a mnemonic RSAD. Depending on the SFR RSAS, CPU and RSA coprocessor read from and write to this register. Data X, N and M are written at the beginning by software while Data M is read is at the end by hardware. The RSAD is reset to 00h by a reset. There is unrestricted read/write access to this SFR.

RSA OPCODE (RSAO)

| Bit: | 7 | 6 | 5 | 4 | 3 | 2 | 1 | 0 |
|---|---|---|---|---|---|---|---|---|
| | — | — | KEND | RST | WX | WN | RWM | RW |

The RSA Opcode Register with mnemonic RSAO receives instructions to configure the operation of the RSA coprocessor. This byte is set or cleared by software for the following purpose.

KEND Key End: This bit is set to tell the coprocessor the key writing is finished.

RST Reset: This bit is set to reset the coprocessor synchronously.

Wx Write Precomputation Constant X: When this bit and RW are set, 128 bytes of data X are written into the coprocessor. When this bit is cleared, data X will not be written.

WN Write Modulus N: When this bit and RW are set, 128 bytes of data N are written into the coprocessor. When this bit is cleared, data N will not be written.

RWM Read Write Message M: When this bit and RW are set, 128 bytes of data M are written into the coprocessor. When this bit is set while RW is cleared, 128 bytes of data M are read from the coprocessor. When this bit is cleared, data M will not be read or written.

RW Read Write Control: When this bit is set, data X, N, M will be written depends on bits WX, WN, RWM. When cleared, 128 bytes of data M are read from the coprocessor if RWM is set.

All possible combination of read/write operation:

| WX | WN | RWM | RW | Read/Write Operation |
|---|---|---|---|---|
| 1 | 0 | 0 | 1 | Write data X |
| 0 | 1 | 0 | 1 | Write data N |
| 0 | 0 | 1 | 1 | Write data M |
| 1 | 1 | 0 | 1 | Write data X and N |
| 1 | 0 | 1 | 1 | Write data X and M |
| 0 | 1 | 1 | 1 | Write data N and M |
| 1 | 1 | 1 | 1 | Write data X, N and M |
| X | X | 1 | 0 | Read data M |
| X | X | 0 | 0 | No operation |
| 0 | 0 | 0 | X | No operation |

The RSAO is reset to 00h by a reset. There is unrestricted read/write access to this SFR.

RSA STATUS (RSAS)

| Bit: | 7 | 6 | 5 | 4 | 3 | 2 | 1 | 0 |
|---|---|---|---|---|---|---|---|---|
| | — | — | — | — | WKR | — | RMR | — |

The status with mnemonic RSAS of the RSA coprocessor is expected to shown in the RSA Status Register. This byte is set or clear by hardware for the following purpose.

WKR Write Key Request: This bit is set to request the CPU to write the next byte of key to the SFR RSAK.

RMR Read Message Request: This bit is set to tell the CPU that the RSA operation is finish and it is ready to read the data M. It also requests the CPU to write instruction to read data M from RSAD.

The RSAS is reset to 00h by a reset.

There is restricted read only access to this SFR.

RSA KEY (RSAK)

| Bit: | 7 | 6 | 5 | 4 | 3 | 2 | 1 | 0 |
|---|---|---|---|---|---|---|---|---|
| | RSAK. 7 | RSAK. 6 | RSAK. 5 | RSAK. 4 | RSAK. 3 | RSAK. 2 | RSAK. 1 | RSAK. 0 |

The SFR with mnemonic RSAK will be used to store the key. One byte of RSA key, i.e. the exponent e or d is written into this register by software, while the bit WKR of the SFR RSAS is set. The RSAK is reset to 00h by a reset. There is unrestricted read/write access to this SFR.

Figure 7:
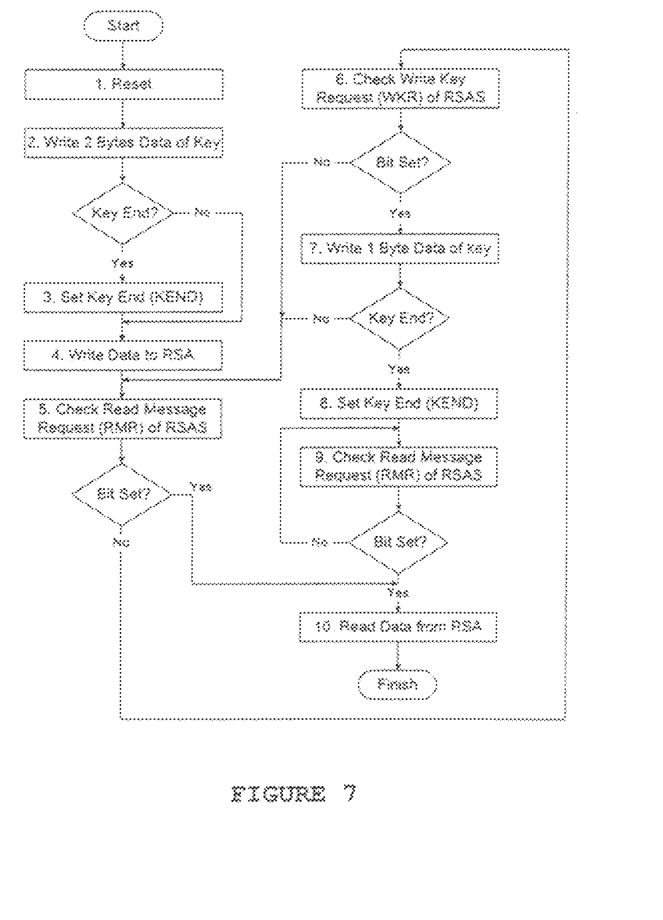
FIG. 7 is a flow diagram of RSA implementation example using polling mode.
Figure 8:
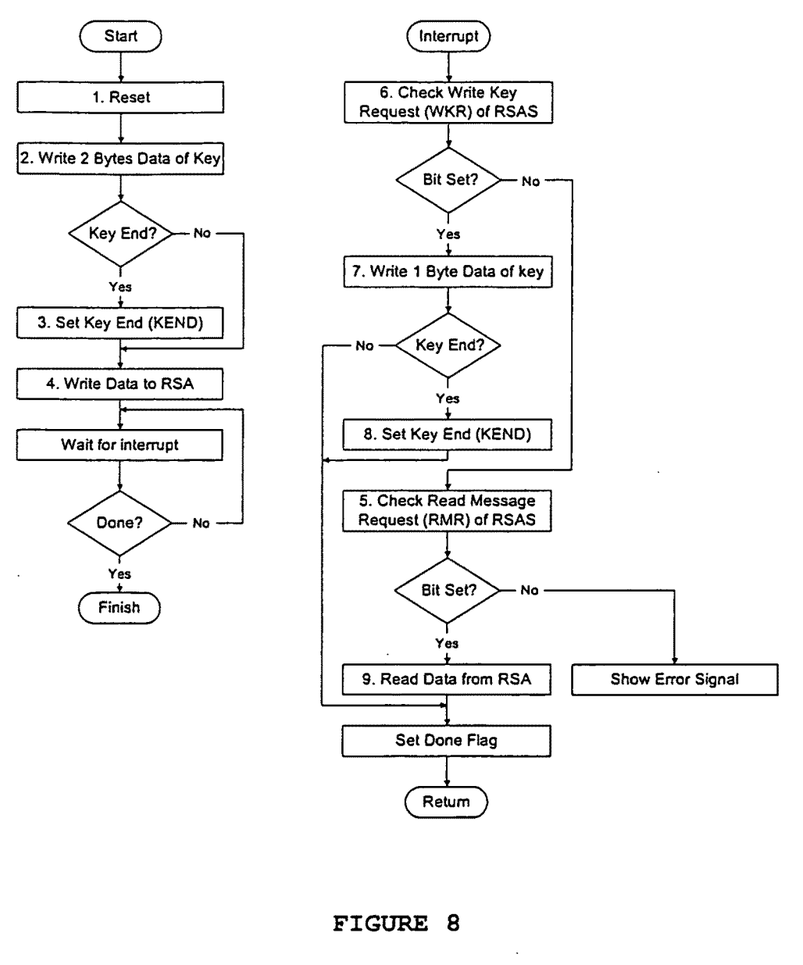
FIG. 8 is a flow diagram of an RSA implementation example using interrupt mode.

The procedure of control the RSA coprocessor to carry out a RSA operation is summarized in FIGS. 7 and 8. The sequence of operation is as follows:

1. The coprocessor must be reset at the beginning of RSA operation; the Reset (RST) bit is set (RSAO=10h) and cleared (RSAO=00h) to reset the coprocessor.

2. Two bytes of RSA key are then written to RSAK, starting from the most significant byte.

3. If the key ends, i.e. the key is less than or equal to 2 bytes, set the bit KEND of RSAO (RSAO=20h) to inform the coprocessor.

4. Set the Write operation by setting appropriate bits in RSAO, followed by writing the data block(s) in the order of data X, N and M into RSAD, starting from the least significant byte of first data block. For example, if RSAO=0Fh, 3×128 bytes of data X, N, and M are written to RSAD sequentially, starting from the least significant byte of data X; If RSAO=0Bh, 2×128 bytes of data X and M are written to RSAD sequentially, starting from the least significant byte of data X; If RSAO=09h, only 128 bytes of data X is written to RSAD, starting from the least significant byte of data X.

5. Check the WKR of RSAS to see whether the RSA coprocessor request next byte of key.

6. If the WKR is set, write one byte of key to RSAK.

7. If the key ends, i.e. all bytes of key is written into RSAK, set the bit KEND of RSAO (RSAO=20h) to inform the coprocessor.

8. Check the RMR to see whether the result data is ready to be read.

9. When it is ready to read the data, the read data M instruction is assigned to the RSAO (RSAO=02h). 128 bytes of data M are read from RSAD, starting from the least significant byte of data M.

Where in the foregoing description reference has been made to methods or elements have known equivalents then such are included as if individually set forth herein.

Embodiments of the invention have been described, however it is understood that variations, improvement or modifications can take place without departure from the spirit of the invention or scope of the appended claims.

What is claimed is:

1. An apparatus comprising:
a modular arithmetic unit configured to iteratively perform modular arithmetic operations; and
an interface control unit coupled with the modular arithmetic unit, and configured to selectively perform cryptographic processing, using inputs, in accordance with a first encryption protocol or a second encryption protocol as selected by the inputs, wherein the first and second encryption protocols are different encryption protocols, and include modular arithmetic operations, and wherein the interface control unit is configured to use the modular arithmetic unit to perform the modular arithmetic operations for cryptographic processing in accordance with the first as well as the second encryption protocol; wherein the modular arithmetic operations include sign inversion operations on temporary data of the modular arithmetic operations, and the modular arithmetic unit includes a sign inversion unit configured to perform the sign inversion operations.

2. The apparatus of claim 1, wherein the modular arithmetic unit further comprises:
a memory unit coupled with the interface control unit and the sign inversion unit, and configured to store data associated with modular arithmetic operations including the temporary data;
a multiplication unit coupled with the memory unit and configured to perform multiplication operations; and
an addition unit coupled with the memory unit and configured to perform addition operations.

3. The apparatus of claim 2, wherein the multiplication unit comprises:
a register to pre-store multiplier data;
a pair of multiplication elements for performing multiplication;
a shift register to load the multiplier data bitwise into the multiplication elements; and
a first-in-first-out register for synchronizing data movement between the multiplication elements.

4. The apparatus of claim 3, wherein the multiplication elements comprise a bitwise segmented multiplier, a bitwise segmented multiplicand, and a modulo for performing modular multiplication of the multiplier and multiplicand according to the modulo value.

5. The apparatus of claim 2, wherein the memory unit has a size substantially equal to 384 bytes and the sign inversion unit has a k-size substantially equal to 64 bits.

6. The apparatus of claim 2 wherein the outputs of the sign inversion unit are configured to be feedback into the memory unit.

7. The apparatus of claim 2, wherein the modular arithmetic unit further comprises an arithmetic controller coupled with the memory, the multiplication unit, the arithmetic unit, and the sign inversion unit, to control the memory, the multiplication unit, the arithmetic unit, and the sign inversion unit to perform the modular arithmetic operations.

8. The apparatus of claim 7, wherein at least some outputs of the multiplication unit, the addition unit and the sign inversion unit are configured to be feedback to the arithmetic controller.

9. The apparatus of claim 1, wherein the interface control unit is further configured to manage communications between the apparatus and a host processor, and maintain synchronization between the apparatus and the host processor, wherein the apparatus is configured to operate at a faster speed than the host processor.

10. The apparatus of claim 1, wherein the interface control unit comprises a concatenation/splitter configured to concatenate or split data provided to or receive from the modular arithmetic unit, and a cryptographic controller coupled with the concatenation/splitter, and configured to generate concatenation/split control signals for the concatenation/splitter, and modular opcodes for the modular arithmetic unit.

11. The apparatus of claim 1, wherein the first encryption protocol is Rivest-Shamir-Adleman, and the second encryption protocol is Elliptic Curve Cryptography.

12. A method comprising:
receiving first inputs for cryptographic processing in accordance with a first encryption protocol, by an interface control unit configured to support cryptographic processing for at least a first or a second encryption protocol;
performing cryptographic processing in accordance with the first encryption protocol, using the first inputs, by the interface control unit, including invoking a modular arithmetic unit to perform modular arithmetic operations;
receiving second inputs for cryptographic processing in accordance with a second encryption protocol that is different from the first encryption protocol, using the same interface control unit; and
performing cryptographic processing in accordance with the second encryption protocol, using the second inputs, by the interface control unit, including invoking the same modular arithmetic unit to perform modular arithmetic operations;
wherein invoking a modular arithmetic unit to perform modular arithmetic operations and invoking the same modular arithmetic unit to perform modular arithmetic operations comprises invoking a sign inversion unit of the same modular arithmetic unit to perform sign inversion operations on temporary data of the modular arithmetic operations.

13. The method of claim 12, wherein receiving first inputs comprises receiving first inputs, by the interface control unit, from a host processor, and the method further comprises transmitting results of the cryptographic processing in accordance with the first encryption protocol, by the interface control unit, to the host processor, wherein the interface control unit and the modular arithmetic unit in combination operates at a higher speed than the host processor.

14. The method of claim 12, wherein receiving second inputs comprises receiving second inputs, by the interface control unit, from a host processor, and the method further comprises transmitting results of the cryptographic processing in accordance with the second encryption protocol, by the interface control unit, to the host processor, wherein the interface control unit and the modular arithmetic unit in combination operates at a higher speed than the host processor.

15. The method of claim 12, wherein performing cryptographic processing in accordance with the first or the second encryption protocol, comprises:
concatenating or splitting data being provided to or receive from the modular arithmetic unit, by the interface control unit; and
generating modular opcodes for the modular arithmetic unit, by the interface control unit.

16. The method of claim 12, wherein the first encryption protocol is Rivest-Shamir-Adleman, and the second encryption protocol is Elliptic Curve Cryptography.

17. The method of claim 12, wherein invoking a modular arithmetic unit to perform modular arithmetic operations and invoking the same modular arithmetic unit to perform modular arithmetic operations further comprises storing results of the sign inversion operations on temporary data, by the sign inversion unit, into a memory unit of the modular arithmetic unit.

18. The method of claim 12, wherein invoking a modular arithmetic unit to perform modular arithmetic operations and invoking the same modular arithmetic unit to perform modular arithmetic operations further comprises feeding back results of the sign inversion operations on temporary data, by the sign inversion unit, to an arithmetic controller configured to control performance of the modular arithmetic operations, including the sign inversion operations.

* * * * *

UNITED STATES PATENT AND TRADEMARK OFFICE
CERTIFICATE OF CORRECTION

PATENT NO. : 8,458,492 B2
APPLICATION NO. : 12/589605
DATED : June 4, 2013
INVENTOR(S) : Cheng et al.

Page 1 of 1

It is certified that error appears in the above-identified patent and that said Letters Patent is hereby corrected as shown below:

In the Specification

In Column 1, Line 41, delete "cryptograhic" and insert -- cryptographic --, therefor.

In Column 2, Lines 6-7, delete "data is movement" and insert -- data movement --, therefor.

In Column 2, Line 12, delete "controller comprises" and insert -- controller comprises: --, therefor.

In Column 3, Line 47, delete "Interface Control Unit 11" and insert -- Interface Control Unit 12 --, therefor.

In Column 4, Lines 52-53, delete "'data$_{13}$ in0'/'data$_{13}$ in1'/'data_in2'/'data_in3'/'data_in4" and insert -- 'data_in0'/'data_in1'/'data_in2'/'data_in3'/'data_in4' --, therefor.

In Column 5, Line 12, delete "'a$_i$+1'" and insert -- 'a$_{i+1}$' --, therefor.

In Column 5, Line 18, delete "(2+k)-bit" and insert -- (2×k)-bit --, therefor.

In Column 7, Line 50, delete "is read is at" and insert -- is read at --, therefor.

In the Claims

In Column 10, Line 41, in Claim 6, delete "claim 2" and insert -- claim 2, --, therefor.

Signed and Sealed this
Twenty-fifth Day of March, 2014

Michelle K. Lee
*Deputy Director of the United States Patent and Trademark Office*